United States Patent [19]

Harkins

[11] 4,201,796

[45] May 6, 1980

[54] METHOD OF COOKING MEAT

[76] Inventor: James L. Harkins, Box 725, 3 Wellington Ave., Ross, Calif. 94967

[21] Appl. No.: 12,353

[22] Filed: Feb. 15, 1979

[51] Int. Cl.² .............................................. A23L 1/01
[52] U.S. Cl. .................... 426/238; 426/243; 426/466; 426/523; 219/10.55 M
[58] Field of Search ............... 426/237, 238, 510, 523, 426/243, 466; 219/10.55 M

[56] References Cited

U.S. PATENT DOCUMENTS

| | | | |
|---|---|---|---|
| 2,945,767 | 7/1960 | Phelan et al. | 426/243 |
| 3,071,065 | 1/1963 | Macy et al. | 426/523 X |
| 3,127,828 | 4/1964 | Fine | 426/523 X |
| 3,949,184 | 4/1976 | Freedman | 426/243 X |

FOREIGN PATENT DOCUMENTS 859948  1/1961  United Kingdom ..................... 426/523

Primary Examiner—Arthur D. Kellogg
Attorney, Agent, or Firm—Melvin R. Stidham

[57] ABSTRACT

The method of cooking meat comprising the steps of searing just the surface of a cut or patty of meat briefly with a blow torch pencil burner and thereafter storing the meat in a refrigerator or freezer compartment. When the meat is to be served, it is thawed and cooked in a microwave oven.

3 Claims, 1 Drawing Figure

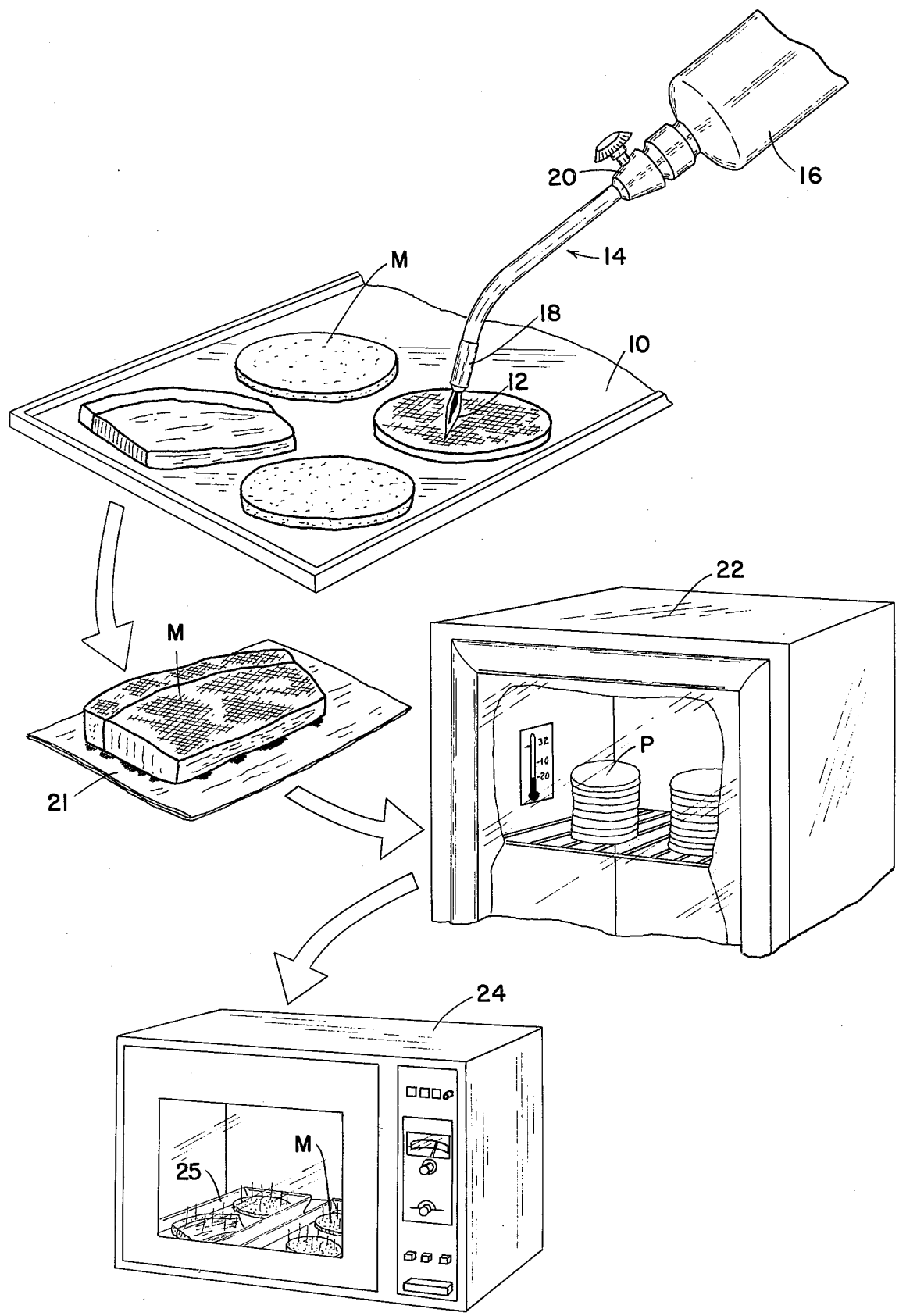

METHOD OF COOKING MEAT

BACKGROUND OF THE INVENTION

Hamburger, steaks and other freshly cooked meats are very popular in America and elsewhere. However, many fast food outlets, such as sandwich shops, where meals are not prepared on a mass production basis, do not have the facilities or time to grill or broil meats slowly over a fire. With the advent of the microwave oven, many fast foods can be heated and served very quickly and efficiently. However, microwave ovens do not brown meats in the manner of ordinary ovens and, a hamburger or steak, for example, so prepared is relatively unattractive and unappetizing.

OBJECTS OF THE INVENTION

It is an object of this invention to provide a method of cooking and browning meats quickly.

It is a further object of this invention to provide a method of cooking in a microwave oven, meats which are appetizing and tempting.

Other objects and advantages of this invention will become apparent from the description to follow, particular when read in conjunction with the accompanying drawing.

BRIEF SUMMARY OF THE INVENTION

In carrying out this invention, I cook meats by first searing just the surface thereof to brown it and to melt away fats, such burning being done very briefly with a pencil flame blow torch burner at an extremely high temperature level. This may be done on a mass production basis and the meat cuts or patties so seared may be stored in a refrigerator or freezer until ready to be served. Thereafter, they may be removed from the cold compartment as ordered and thawed and cooked very quickly in a microwave oven, thus providing a steak, hamburger or other cut of meat which is cooked to taste and which is brown and tempting in appearance.

BRIEF DESCRIPTION OF THE DRAWINGS

The FIGURE illustrates the progressive steps of cooking meat in accordance with the method of this invention.

DESCRIPTION OF A PREFERRED METHOD

Referring now to the drawing with greater particularity, meat M, such as a cut of steak or hamburger are placed on a suitable support surface 10, which on a mass production basis could be a moving conveyor (not shown), and subjecting them to the high intensity heat pencil flame 12 of a blow torch burner 14, such as that shown in U.S. Pat. No. 3,663,154. In such a burner, a gas is delivered at high velocity from a container or bottle 16 to a pencil flame 12 at the nozzle 18 under control of a flow adjustment valve 20.

The high intensity flame tends to melt any fat content at the surface very quickly without causing any flareup of flame. The intense heat is applied for just a few seconds to each increment of area and the surface browning can be completed manually on each side in less then two minutes. This sears and browns just the surface of the meat to a very slight depth, leaving the inside of the meat relatively raw. Besides destroying the surface fat, the searing imparts a flame-broiled flavor and, the surface searing, together with a very thin coating of fat melted thereby, seem to seal in the flavor indefinitely, and prevent deterioration.

After searing, the meat portions may be placed briefly on an absorbent member 21, such as paper toweling, and then placed in a cold storage compartment 22. For relatively indefinite storage the portions may be frozen, because the meat is for all intents and purposes raw, and not subject to the taste-deteriorating effects of freezing after cooking.

When it is desired to cook the meat portions, as when preparing for a day's cooking, or even as an order is placed in a sandwich shop, the desired number are removed from the cold compartment and, if frozen thawed. Then, the portions are placed in a microwave oven 24 and cooked in a short period of time, preferably on an absorbent tray or dish 25 as of Styrofoam to soak up the previously, broken-down fat which remained on the surface. The result is a hamburger patty or other cut of meat which is cooked to taste and which is brown on the surface, giving it an appetizing and tempting appearance.

While this invention has been described in conjunction with a preferred method thereof, it is obvious that modifications and variations therein may be made by those skilled in the art without departing from the spirit and scope of this invention, as defined by the claims appended hereto.

Having described my invention, I claim:

1. The method of cooking meat portions comprising the steps of:
   searing just the surface of the meat briefly with a well-defined pencil flame of high velocity burning gas while leaving the center uncooked;
   removing the heat; and
   thereafter cooking the meat to a greater depth in a microwave oven.
2. The method of cooking meat defined by claim 1 including the step of:
   storing the meat in a cold storage compartment after surface searing and prior to cooking.
3. The method of cooking meat defined by claim 1 wherein:
   the meat is placed in the microwave oven in a liquid absorbing member.

* * * * *